United States Patent [19]

Erlenbach

[11] Patent Number: 5,100,597
[45] Date of Patent: Mar. 31, 1992

[54] METHOD FOR THE MANUFACTURE OF MOLDED OBJECTS OF FOAMED, THERMOPLASTIC SYNTHETIC MATERIAL

[76] Inventor: Hans Erlenbach, Hermann-Lons-Str. 13, D-5428 Nastatten, Fed. Rep. of Germany

[21] Appl. No.: 464,289

[22] Filed: Jan. 12, 1990

[30] Foreign Application Priority Data

Jan. 24, 1989 [DE] Fed. Rep. of Germany ....... 3902002

[51] Int. Cl.$^5$ ............................................. B29C 67/22
[52] U.S. Cl. ..................................... 264/51; 264/40.3; 264/40.6
[58] Field of Search .......... 264/40.3, 50, 51, DIG. 10, 264/40.6

[56] References Cited

U.S. PATENT DOCUMENTS

| | | | |
|---|---|---|---|
| 3,264,381 | 8/1966 | Stevens | 264/16.DIG. 10 |
| 3,452,124 | 6/1969 | Knapp | 264/500 |
| 3,869,557 | 3/1975 | Vrespa | 426/93 |
| 4,274,818 | 6/1981 | Montgomery et al. | 264/DIG. 10 |
| 4,482,306 | 11/1984 | Hahn | 264/40.6 |
| 4,537,007 | 8/1985 | Lattanzi | 53/425 |
| 4,685,872 | 8/1987 | Erlenbach | 264/40.3 |
| 4,783,292 | 11/1988 | Rogers | 264/40.6 |
| 4,800,050 | 1/1989 | Hahn et al. | 264/40.6 |
| 4,801,361 | 1/1989 | Bullard et al. | 264/40.6 |
| 4,818,451 | 4/1989 | Arai et al. | 264/40.3 |
| 4,822,542 | 4/1989 | Kuwabara et al. | 264/40.3 |

FOREIGN PATENT DOCUMENTS

| | | |
|---|---|---|
| 1504590 | 10/1969 | Fed. Rep. of Germany . |
| 2129046 | 6/1971 | Fed. Rep. of Germany . |
| 2166710 | 6/1971 | Fed. Rep. of Germany . |
| 2237397 | 7/1972 | Fed. Rep. of Germany . |
| 62-174135 | 7/1987 | Japan ........................... 264/40.3 |

Primary Examiner—Robert A. Dawson
Assistant Examiner—Allan R. Kuhns
Attorney, Agent, or Firm—H. Gibner Lehmann; K. Gibner Lehmann

[57] ABSTRACT

In a method for making objects of foamed, thermoplastic synthetic substance, air pressure is maintained in the mold while it and the contained plastic particles are heated, said air pressure being equal to or slightly higher than the pressure of the steam used for heating. When the mold has reached the saturated steam temperature, the air pressure is reduced to fuse the prefoamed synthetic particles together. Thereafter steam is introduced to displace the air in the mold and heat the synthetic particles to the temperature required for fusing or sintering.

10 Claims, 4 Drawing Sheets

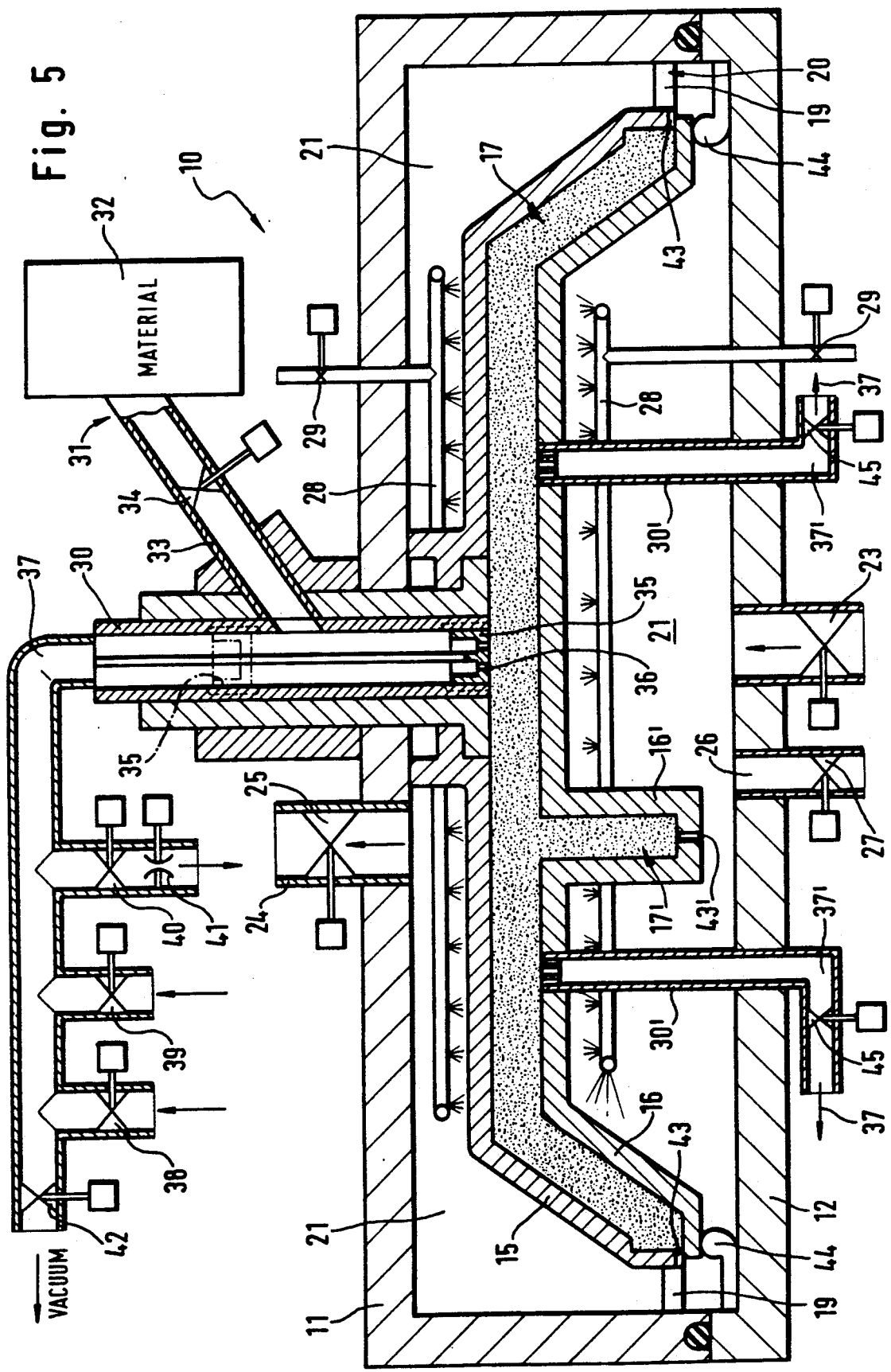

METHOD FOR THE MANUFACTURE OF MOLDED OBJECTS OF FOAMED, THERMOPLASTIC SYNTHETIC MATERIAL

CROSS REFERENCES TO RELATED APPLICATIONS

The present application claims priority under 35 USC 119, of West German Application No. P 39 02 002.9 filed Jan. 24, 1989, and having common ownership with the present application.

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates generally to a method for the manufacture of molded objects of prefoamed, thermoplastic synthetic material. In particular, by the invention prefoamed, synthetic particles are placed in a mold cavity by means of an air current and are distributed in said mold cavity and further foamed and fused or sintered to each other by the effect of heat and steam, the molded objects thus formed being then cooled by use of the mold surfaces of the mold cavity and removed from the mold cavity after having essentially reached stability of shape. The invention also relates to an apparatus for the execution of the above method, said apparatus being equipped with a split mold containing a mold cavity that is formed between mold wall parts.

2. Description of the Related Art Including Information Disclosed Under 37 CFR §§1.97-1.99

In known methods and apparatus for the manufacture of foamed plastic moldings, such as described in German Printed Application No. 1 504 590, for example, steam is introduced, after the mold wall parts are heated, into the mold cavity between the expanding, prefoamed synthetic particles through nozzles distributed over the mold wall areas, such steam being provided from a steam chamber that is formed on the rear side of the mold wall parts. To cool the mold wall parts and the molded objects formed in the mold cavity, the steam is sucked out of the steam chambers after its introduction into the mold cavity, and cold water is then sprayed against the backside of the mold wall parts. Residual steam in the steam chambers is condensed by the sprayed water. But the steam introduced into the mold cavity, i.e. the steam between the expanding synthetic particles, is also condensed by this cooling operation. The porous moldings thus produced are moist and must be dried more or less before they can be used for their intended purpose.

It was attempted, furthermore, to produce dry, foamed, molded objects or parts by designing the mold cavity so as to be pressure-tight with respect to the steam chamber, whereby the introduction of steam into the mold cavity to fuse the expanding synthetic particles tool place only after the mold wall parts were heated to the point where condensation of the inflowing steam could no longer occur on the parts. The mold walls can be heated either by steam or else by means of a liquid heat-carrying media (see German Printed Application No. 21 29 046 and German Printed Application No. 21 66 710). In these publications the steam required for the fusing or sintering of the expanding synthetic particles is introduced through special steam lines that are separate from the heating and cooling chambers and that utilize special control devices. These known methods and known apparatus necessitate much equipmental cost. Especially, it is difficult and expensive to provide for the transfer of heat to all spots of the mold wall parts with sufficient uniformity.

In another attempt, as described in German Printed Application No. 22 37 397, while providing for the use of steam to heat the mold wall parts and, for that reason, for the formation of steam chambers on the rear side in the mold halves, the steam to be introduced into the mold cavity for fusing or sintering the foaming synthetic particles is not to be transferred into the mold cavity from the heating and cooling chambers. Rather, separate steam chambers are to be formed in the mold halves, whence transfer channels or transfer lines go into the mold cavity via nozzles. However, the mold wall parts in this known method and in this known apparatus are subjected to high pressure loads. Therefore, the mold wall parts must be designed ruggedly with relatively thick walls, again leading to considerable energy losses in view of the heat capacity of the mold wall parts, and causing relatively long cycle times in the machine operation.

SUMMARY OF THE INVENTION

In contrast thereto it is the task of the present invention to provide an improved method and apparatus for the manufacture of foam moldings, which involves only relatively small pressure differences between the mold cavity and the steam chamber associated with the mold wall parts, thereby making possible the use of thin-walled mold wall parts of relatively little heat capacity. The temperature difference between mold wall parts in heated and in cooled condition is reduced to a minimum, thereby to limit the energy losses to a minimum. Finally, the time required for one work cycle of the molding machine is as short as possible. With all this, the moldings removed from the mold cavity still have smooth, dimensionally correct surfaces and are sufficiently dry for their intended use, whereby they need no additional drying treatment.

In the method according to the invention, this problem is solved in that the mold wall parts enclosing the mold cavity with its filling of prefoamed, plastic particles are heated to a certain molding temperature by steam under pressure, which is introduced into at least one steam chamber disposed on the outsides of the mold wall parts. During this heating operation, air having at least the same pressure as that of the steam used to heat the mold wall parts is maintained within the mold cavity between the synthetic particles of the filling, thereby preventing the steam from penetrating between the synthetic particles of the filling. The filled synthetic particles distributed in the mold cavity are now flushed by steam after the mold wall parts are heated and the enclosed air is flushed out by reducing the air pressure, thereby heating the synthetic particles with very little or no condensate formation, and thus fusing or sintering them.

What the invention achieves is that approximately the same pressure is maintained inside the mold cavity during all phases of the method, i.e. when filling the mold cavity with foamable synthetic particles, while heating the mold wall parts and also while steaming the foaming and fusing or sintering synthetic particles, as prevails in the steam chamber formed at the outside of the mold wall parts. Apart from the fact that, due to this almost equal pressure in both the mold cavity and the steam chamber, the mold wall parts can be designed relatively thin and of little heat capacity, the invention offers particularly favorable possibilities of defining the various process phases more precisely relative to each other. An air escape as small as possible from the mold cavity into the steam chamber while the mold wall parts are being heated can be tolerated in order to thus prevent safely the penetration of steam into the filling during the process phase. What is achieved in particular is that the transfer of steam from the steam chamber into the mold cavity takes place only within a precisely defined time span in a work cycle, namely after the mold cavity is filled and the mold wall parts are heated. Due to this, condensate formation is already prevented during the transfer of steam from the steam chamber into the mold cavity. Whereas the complete sealing of the mold cavity against the steam chambers presents problems in the known methods for the manufacture of dry moldings, the method according to the invention is characterized by the omission of all sealing elements between mold cavity and steam chambers, thus making possible, among other things, a considerably simplified design of the molds.

Due to greatly reducing the heat capacity in the mold wall parts and the defined separation of the process phases, it is possible in the method according to the invention to reduce the cycle time considerably as compared to that of conventional methods. For the same reasons, the method according to the invention also achieves a substantial reduction of the amount of energy to be consumed.

Advantageous further developments and complements of the method according to the invention are characterized in the appended claims 2 through 8.

Especially suited for the execution of the method according to the invention is an apparatus which is assumed to have a split mold forming a mold cavity between the mold wall parts, there being formed in the mold parts, on the outside of the mold wall parts, a steam chamber connectable by means of controllable valves to a steam supply, to the outside air and to a scavenging device or evacuator, and there being provided on at least one mold part at least one airflow-operated device for the introduction of prefoamed synthetic particles into the mold cavity and for admitting amounts of air to build up and maintain the air pressure in the mold cavity, and there being disposed on the mold wall parts passages to let out the air used for filling and to let in the steam used to fuse or sinter the synthetic particles.

According to the invention, this apparatus is characterized in that the mold cavity is connectable, via at least one connecting line leading to the outside of the foaming device, to a valve-controlled operating line for the introduction and removal of compressed air and for the evacuation of steam, while each one of the passages formed on and/or between the mold wall parts is designed to let out of the mold cavity the compressed air used for filling and let into the mold cavity the steam used for fusing the synthetic particles, each of said passages being disposed in places suited for both functions and thus forming a through-connection between the steam chamber and the mold cavity.

Whereas the nozzle-shaped steam inlet openings to the mold cavity of the prior foam molding machines and foam molds hitherto in common use are distributed over the area of the mold wall parts, and the outlet openings for the filling air lead directly from the mold cavity to the outside, i.e. not into the steam chamber, according to this invention the inlet openings for the steam used for fusing, leading from the steam chamber into the mold cavity are combined with the outlet openings for the air flow used to fill the mold cavity and need only be disposed in places that are suited for both functions, i.e. they need no longer be distributed over the mold wall parts area. It is thereby consciously tolerated that the air which is used to introduce into and distribute the synthetic particles in the mold cavity can be removed through the steam chamber. The consequence thereof is, on the other hand, that a constant pressure equalization occurs between steam chamber and mold cavity. Apart from the relatively weak foaming pressure of the synthetic particles, no noteworthy overpressure can occur in the steam chamber as compared to the mold cavity. With respect to their thickness, the mold wall parts can practically be designed only for sufficient stability to withstand the foaming pressure of the material and can have substantially thinner walls than heretofore. Besides a considerable price advantage, this thin-walled design offers the advantage of little heat capacity and, hence, faster temperature control inside the mold and substantially less energy consumption. Due to the thus achieved temperature control inside the mold, virtually free of inertia, it is achieved, in conjunction with the steam removal via a novel connecting line, that condensate formation inside the molding during the cooling phase is largely prevented.

Other advantageous features of the method according to the invention are characterized in the appended the appended dependent claims.

Additional features and advantages will hereinafter appear.

BRIEF DESCRIPTION OF THE DRAWINGS

Embodiment examples of the invention are explained below in greater detail with reference to the drawings, in which:

FIG. 5 illustrates diagrammatically a foaming machine according to a modified embodiment, shown in the same manner as FIG. 1.

DESCRIPTION OF THE PREFERRED EMBODIMENT

The example of FIGS. 1 through 4 involves an apparatus for the manufacture of molded objects or parts of foamed synthetic, e.g. foamed polystyrol. The foaming apparatus 10 shown in FIG. 1 has two steam chamber halves, namely a top part 11 and a core part 12. Inserted in each of these steam chamber halves are one or several conforming mold wall parts 15 and 16, respectively.

Figure 1:
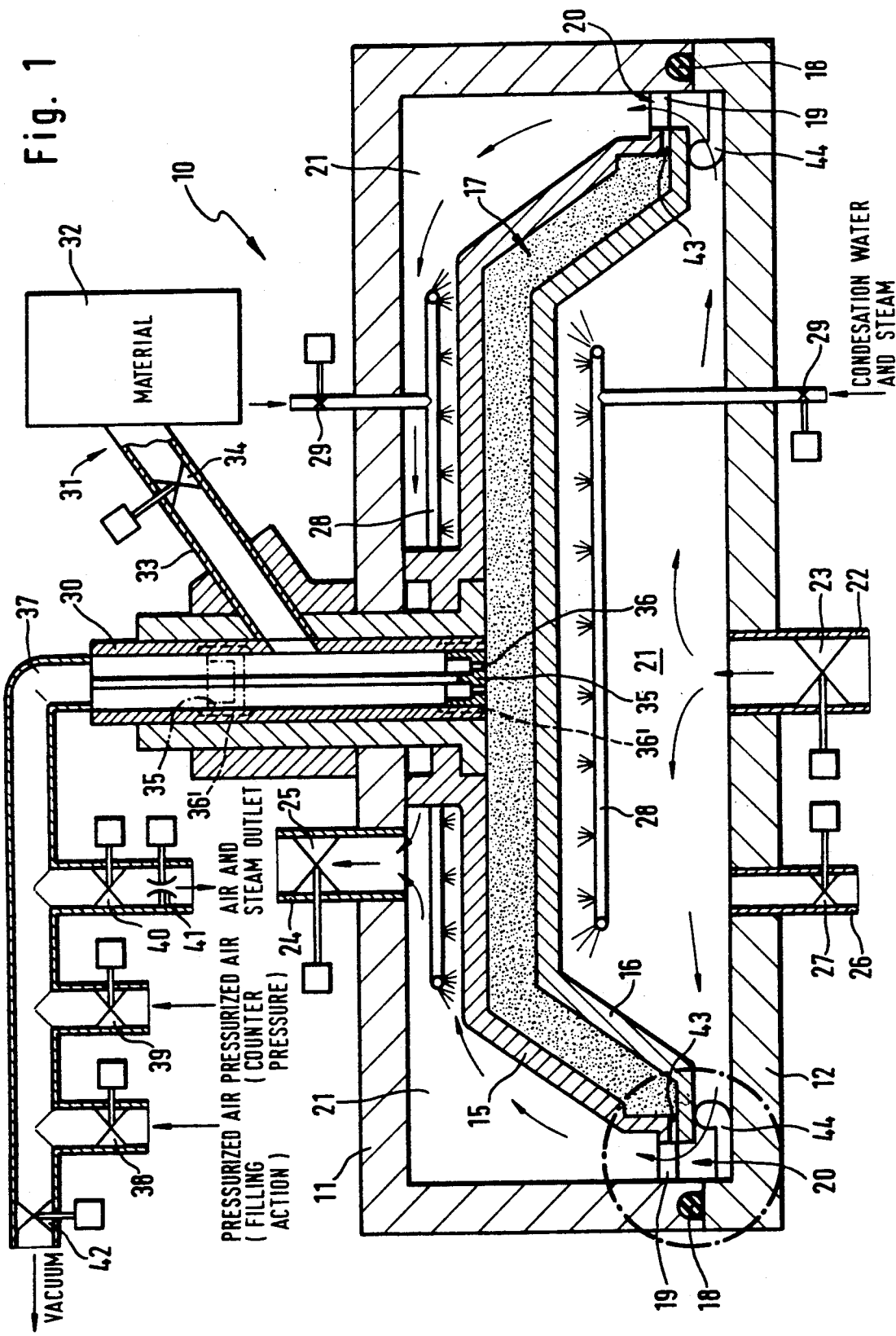
FIG. 1 illustrates diagrammatically a foaming machine according to the invention, revealing a simple embodiment thereof.
Figure 2:
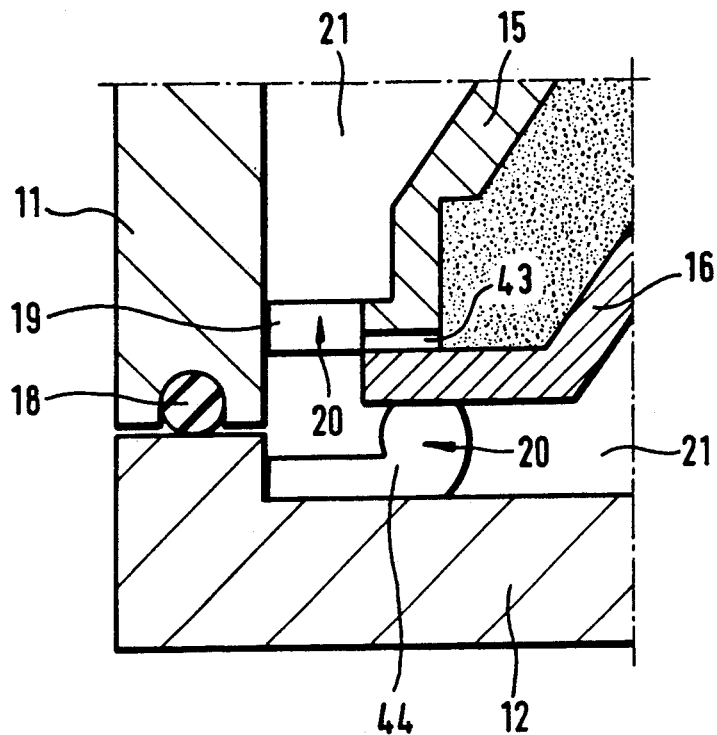
FIG. 2 is a detail of the area II in FIG. 1, in enlarged representation.
Figure 3:
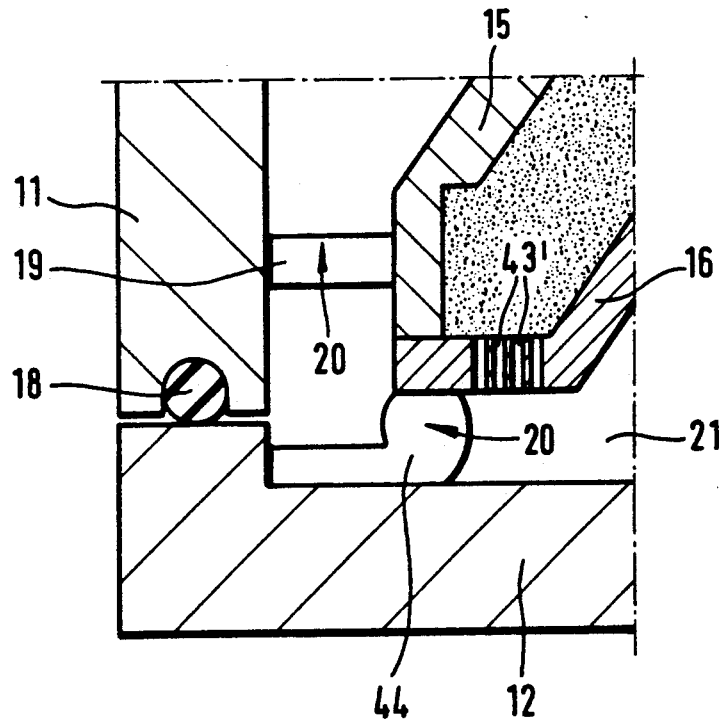
FIG. 3 is a detail of the area II in FIG. 1, in enlarged representation but showing a somewhat modified embodiment.
Figure 4:
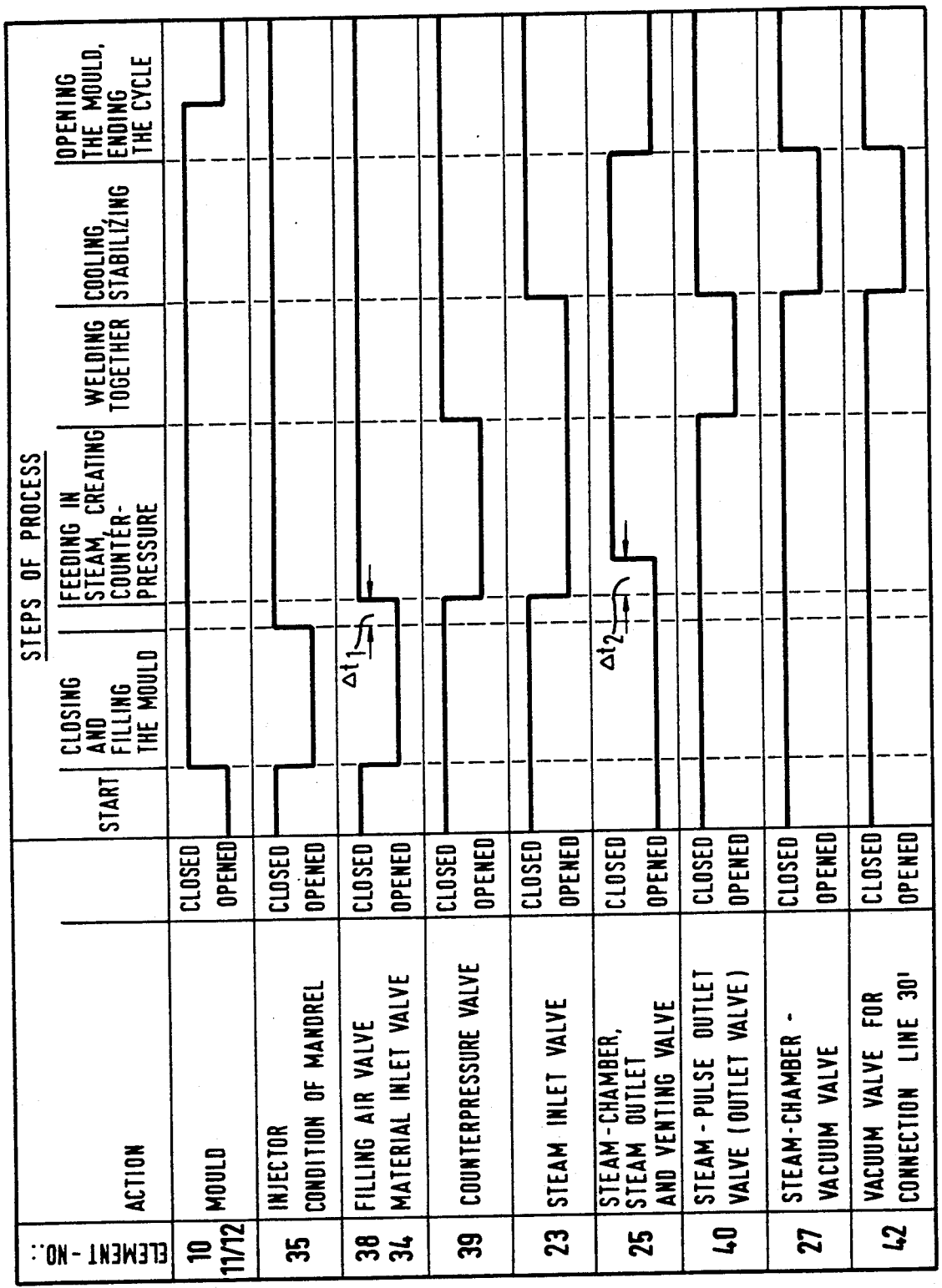
FIG. 4 is a control chart for a foaming machine according to FIGS. 1 to 3, for the execution of a method according to the invention.

Between the two mold wall parts 15 (top) and 16 (core) a mold cavity 17 is formed. The top part 11 and the core part 12 can be separated from each other and are moved towards each other to close the mold and sealed against each other by means of a seal 18 to form a closed interior in which the mold wall parts 15 and 16 are mounted. The mold wall parts 15 and 16 are fastened to the outside wall parts of the steam chamber halves 11 and 12 by means of fastening devices 19 which form passages 20 so that, when the mold is closed, the interior enclosed by the two steam chamber halves 11 and 12 forms one common steam chamber 21, the peripheral rims of the mold wall parts 15 and 16 sitting on top of each other inside the steam chamber 21. In the example of FIGS. 1 and 2, passages 43 in the form of slots extending in circumferential direction of the mold cavity 17 and about 0.2 mm wide and up to several centimeters long are formed in said peripheral rims. In the example of FIG. 3, the rim areas of the mold wall parts 15 and 16 are designed so that the peripheral rim of the hood-shaped mold wall part 15 places itself on top of the peripheral rim of the core-shaped mold wall part 16 in sealing fashion. However, nozzle-shaped passages 43' are provided at intervals within the peripheral rim of the core-shaped mold wall part 16, forming a connection between the mold cavity 17 and the steam chamber 21 through which air and steam can flow. To make sure of a tight fit between the peripheral rims of the mold wall parts 15, 16 when the sealing element 18 is sealingly compressed, the mold wall part 16 can be mounted in the steam chamber part 12 by means of elastically buffering fastening elements 44 in both embodiments.

Connected to the steam chamber 21 are at least one steam inlet 22 with a steam inlet valve 23 centrally controlled on the machine and at least one steam outlet 24, again with a centrally controlled steam outlet valve 25. Also attached to the steam chamber 21 is a vacuum connection 26 with a centrally controlled suction valve 27.

Furthermore, spraying devices 28 for the application of a coolant can be inserted in the steam chamber 21. These spraying devices 28 are likewise equipped with centrally controlled valves 29. They serve the wetting of the surfaces of the mold wall parts 15 and 16 facing the steam chamber 21 in order to cool them. Design and function of these devices can be in accordance with German Patent Application No. P 28 26 875.7.

Connected to the mold cavity 17 is at least one connecting line 30 conducted through the mold wall part 15 and through the steam chamber top 11 in the example shown. The filling device 31 for the prefoamed synthetic particles to be processed is attached to this connecting line 30. This filling device has a closed raw material container 32 and is known per se. At least one centrally controlled raw material valve 34 is inserted in the connecting line 33 from the raw material container 32 to the connecting line 30. Furthermore, as another component of the filling device 31, there is mounted, so as to be axially movable between the closed position shown in full lines in FIG. 1 and the open position shown in broken lines, a quill valve 35. In the embodiment shown, this quill valve 35 has, in its quill plate, through holes 36 which, however, do not permit the passage of prefoamed synthetic particles. Instead of the holes 36 in the quill plate 35 there could also be provided, in the wall of the connecting line 30, channels 36' bridging the quill plate in closed position, such as axial slits or holes as indicated in dashed lines in FIG. 1.

Attached to the connecting line 30 and the operating line 37 containing the valves required for operation of the mold, are the following:

A centrally controlled filling air valve 38 to which the air needed to operate the filling device 31 in the manner of an injector and to distribute the synthetic particles in the mold cavity 17 is fed; a centrally controlled counterpressure valve 39 to which compressed air is fed under a pressure equal to or slightly higher than the pressure of the steam introduced into the steam chamber 21; a steam venting valve 40 with an adjustable flow control 41 downstream to let off air contained in the mold cavity and let off steam flushing through the mold cavity; and a suction valve 42 connected to an evacuator.

This apparatus is suited for the execution of the following special method for the manufacture of moldings of foamed plastic. The process is explained as follows, with reference to FIG. 4:

At the start of the work cycle the mold is closed first so that a closed, single-unit steam chamber 21 is formed at the sealing device 18 by the two steam chamber parts 11 and 12, except for the valve-controlling connections. After the mold is closed, the filling device 31 is put into motion. To do this, the quill plate 35 is moved into the open position shown in dashed lines. The raw material valve 34 and the filling air valve 38 are opened. The counterpressure valve 39 and the steam venting valve 40 are closed whereas the steam outlet valve 25 on the steam chamber 21 is open. Given these valve positions, raw material is sucked or pushed through the raw material valve 34 into the connecting line 30 where it is gripped by the filling air that is coming from valve 38 and is flowing through the holes 36 in the quill plate 35, and such raw material then distributed in the mold cavity 17. The air flow penetrates the passages 43 leading from the mold cavity 17 into the steam chamber, said passages 43 being distributed in the example of FIG. 1 over the peripheral rim of the mold part 15 as constantly open through slots of e.g. 0.2 mm width. The air flowing through the passages 43 flows through the steam chamber 21 and through the opened steam venting valve 25 to the outside.

To terminate the filling operation, the quill plate 35 is moved into its lower end position while the filling air valve 38 and the raw material valve 34 remain open for a time span $\Delta t_1$ of e.g. 0.1 to 1 second in order to return all synthetic particles still in the connecting line 33 into the raw material container 32. As the valves 34 and 38 are closed, the counterpressure valve 39 and the steam inlet valve 23 are opened. This causes the steam chamber 21 to be flushed with steam, whereby the air in the steam chamber is flushed out until, after a flushing time span $\Delta t_2$ since the steam inlet valve 23 was opened has elapsed, the steam outlet valve 25 on the steam chamber 21 is closed. The steam chamber 21 is now filled with saturated steam until a pressure desired to heat the mold wall parts 15 and 16 has built up. At the same time, compressed air is introduced into the mold cavity 17 from the counterpressure valve 39 until a counterpressure has built up there which is just as high as or even a little higher than the steam pressure in the steam chamber 21.

The counterpressure buildup in the mold cavity 17 in comparison with the saturated steam pressure built up in the steam chamber 21 can be controlled by manual adjustment or by the use of a differential pressure valve. The counterpressure buildup in the mold cavity 17 prevents steam from getting from the steam chamber 21 through the passages 43 into the mold cavity 17. It is easier for some compressed air to flow from the mold cavity 17 through the passages 43 into the steam chamber 21.

After the desired heating time for the mold wall parts 15 and 16 has elapsed, the foamed synthetic particles are fused by means of steam. Towards this end, the counter-pressure valve 39 is closed and the steam venting valve 40 opened after the flow control 41 was set to a desired flow rate. This causes the pressure of the air present between the synthetic particles to drop. This, in turn, causes steam from the steam chamber 21 and with constant resupply through the open steam inlet valve 23 to be pushed through the passages 43 into the mold cavity 17 and through the porous plastic filling in the mold cavity 17. This steam, flowing through the filling of the mold cavity 17 in the manner of a steam shock, then reaches the outside by penetrating the holes 36 in the quill plate 35, the connecting line 30, the operating line 37, the steam venting valve 40 and the flow control 41. This steam conduction achieves a pressure difference only as small as needed for the desired flow behavior to be built up between the mold cavity 17 and the steam chamber 21. This fusing of the synthetic particles by flushing them with steam may cover a time span of e.g. 1 second. The saturated steam used for fusing may be of a temperature between 110° C. and 160° C., depending on the material. After completion of the fusing phase the steam venting valve 40 and the steam inlet valve 23 are closed. The valves 29 for coolant feeding are opened if required. The suction valves 27 and 42 are also opened. In this manner, the steam is sucked out of the connecting line 30, the operating line 37 and the steam chamber 21 simultaneously. Condensate caught or coolant sprayed on the surface of the mold wall parts 15 and 16 facing the steam chamber 21 are also evaporated so that the mold wall parts 15 and 16 are cooled due to the suction action.

To provide the heat for the molding operation, the mold wall parts are heated to 110° C. to 160° C. by the saturated steam supplied to the steam chamber 21, whereas the temperature at the mold wall parts 15 and 16 is reduced for the cooling operation to about 60° C. to 100° C., depending on the material. To open the mold, the suction valve 27 must be closed and the steam chamber vented, whereas the suction valve 42 may still remain open in order to retain the molding on the mold wall part 15. After the mold is opened, the suction valve 42 must then be closed and possibly one of the compressed air valves 38 or 39 opened briefly if it is desired to eject the molding from the mold wall part 15 by compressed air. This concludes the work cycle, which is then repeated in the manner described.

The embodiment of the foam molding machine shown in FIG. 5 is basically of the same design as that of the machine according to FIG. 1. FIG. 5 shows additionally a mold cavity 17' designed to mold a molding with parting wall. In that case, in order to let the filling air out of and fusing steam into the mold cavity 17', an additional and necessary spot suited for the function is provided at the depression in the mold cavity 17' forming the parting wall of the molding. Therefore, additional through holes 43' are provided there in the molding wall 16'.

For more complicated designs of the mold cavity it is recommended that there be provided additional connecting lines 30' via operating lines 37' to the operating line 37, but they do not have to be connected to a filling device 31. In this case, the input of filling air into the connecting lines 31 is also obviated. On the mold wall part 16', FIG. 5 shows the connecting lines 30' and operating lines 37', it being prevented there that filling air be introduced at these points into the mold cavity 17 or 17', by valves 45. The work cycle and the control of these devices are analogous to the above described operational and procedural functions for the apparatus according to FIG. 1.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. In a method for the manufacture of a foamed, thermoplastic synthetic object in a mold having a mold cavity enclosed by mold wall parts and at least one steam chamber provided at the outside of said mold wall parts and openings in said mold wall parts connecting said mold cavity with said steam chamber, the steps of:
    a) placing a load of prefoamed synthetic particles in the mold cavity by the use of an air current and distributing said particles in said mold cavity,
    b) after said mold cavity is loaded with said prefoamed synthetic particles, heating the mold wall parts enclosing said mold cavity to a desired molding temperature by introducing steam under pressure into said steam chamber,
    c) introducing substantially dry gas into the mold cavity and between the synthetic particles of the load at the same time as introducing said steam under pressure into the steam chamber and developing a gas pressure which is at least as great as and almost equal to the pressure of the steam in the steam chamber such as to maintain a gas escape from said mold cavity into the steam chamber to prevent safely the penetration of steam into the load particles during said heating step,
    d) maintaining pressure conditions of gas and steam pressures within the mold cavity and within the steam chamber for a heating time to heat the mold wall parts to a temperature high enough to prevent condensation of steam at the surfaces of the mold wall parts during the following flushing step,
    e) after the mold wall parts have been so heated to the condensation-preventing temperature, then removing the introduced gas from the mold cavity and allowing the steam to flush into the mold cavity and between the synthetic particles distributed therein, to thereby further heat said synthetic particles with a minimum of condensation and to thus cause fusing of the particles to each other, and finally,
    f) cooling the mold cavity after the object has essentially reached stability of shape.

2. The method according to claim 1, wherein cooling of the mold wall parts is accomplished by evaporation of the condensate collected on the outside of the mold wall parts and of condensate applied to the outside of the mold wall parts, generating a vacuum.

3. The method according to claim 2, wherein a mixture of steam and steam condensate is sprayed on the outside of the mold wall parts.

4. The method according to claim 2, wherein, for cooling the mold wall parts, the mold cavity containing the load and a steam chamber disposed at the outside of the mold wall parts are essentially evacuated simultaneously.

5. The method according to claim 1, wherein the introduced dry gas which is maintained between the synthetic particles for the duration of the heating of the mold wall parts subsequent to filling the mold cavity, is kept at a slight overpressure over the pressure of the steam used to heat the mold wall parts whereby only a negligibly small amount of dry gas from the mold cavity infiltrates the steam, such infiltered gas however preventing the steam from permeating the load particles in the mold cavity while the mold wall parts are being heated.

6. The method according to claim 1, wherein the gas pressure within the mold cavity during the heating of the mold wall parts is maintained with preheated air.

7. The method according to claim 6, wherein the air used for maintaining said gas pressure is preheated to a temperature below the softening temperature of the particles to be processed.

8. The method according to claim 1, wherein the steam chamber which is disposed on the outside of the mold wall parts is flushed with steam introduced into the steam chamber for a time $t_2$ of up to 1 second and then steam which is used for heating the mold wall parts is kept in the steam chamber and brought to said steam pressure condition.

9. The method according to claim 7, wherein the prefoamed synthetic particles are polystyrol and the air used for maintaining gas pressure is preheated to a temperature in the range of from about 60° C. to about 70° C.

10. In a method for the manufacture of foamed, thermoplastic synthetic objects in a mold having a mold cavity enclosed by mold wall parts and at least one steam chamber provided at the outside of said mold wall parts and openings in said mold wall parts connecting said mold cavity with said steam chamber, the steps of:
   a) placing a load of prefoamed synthetic particles in the mold cavity by the use of an air current and distributing said particles in said mold cavity,
   b) after said mold cavity is loaded with said prefoamed synthetic particles, heating the mold wall parts enclosing said mold cavity to a desired molding temperature by introducing steam under pressure into said steam chamber,
   c) introducing a substantially dry gas into the mold cavity and between the synthetic particles of the load at the same time as introducing said steam under pressure into the steam chamber and developing a dry as pressure which is at least as great as and almost equal to the pressure of the steam in the steam chamber,
   d) maintaining pressure conditions of gas and steam within the mold cavity and within the steam chamber for a predetermined heating time to prevent penetration of steam between the said synthetic particles of the load during said heating of the mold wall parts,
   e) after the synthetic particles of the load have been heated by the said mold parts, flushing out from the mold cavity the introduced gas,
   f) flushing the load of heated synthetic particles distributed in the mold cavity by said steam to thereby further heat said synthetic particles with a minimum of condensation and to cause fusing of the particles to each other, and
   g) cooling the mold cavity after the object has essentially reached stability of shape.

* * * * *